(12) United States Patent
Sasadai (10) Patent No.: US 9,218,144 B2
(45) Date of Patent: Dec. 22, 2015

(54) IMAGE FORMING APPARATUS AND IMAGE FORMATION METHOD THAT PERFORM PACKET RESPONSE IN THE POWER SAVING MODE

(71) Applicant: KYOCERA Document Solutions Inc., Osaka (JP)

(72) Inventor: Koji Sasadai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/606,036

(22) Filed: Jan. 27, 2015

(65) Prior Publication Data

US 2015/0212767 A1  Jul. 30, 2015

(30) Foreign Application Priority Data

Jan. 27, 2014  (JP) ................. 2014-012229

(51) Int. Cl.
  *G06F 15/00*  (2006.01)
  *G06F 3/12*  (2006.01)
  *G06K 1/00*  (2006.01)
  *G06K 15/00*  (2006.01)

(52) U.S. Cl.
  CPC ............ *G06F 3/1221* (2013.01); *G06F 3/1236* (2013.01); *G06K 15/4055* (2013.01)

(58) Field of Classification Search
  CPC .. G06F 3/1221; G06F 3/1236; G06K 15/4055
  USPC ......................................... 358/1.1, 1.15, 1.13
  See application file for complete search history.

(56) References Cited

U.S. PATENT DOCUMENTS 8,261,113 B2 *  9/2012  Yasuda .......................... 713/320
8,635,479 B2 *  1/2014  Soga ............................... 713/323

FOREIGN PATENT DOCUMENTS

JP  2011-142577 A  7/2011

* cited by examiner

*Primary Examiner* — Douglas Tran
(74) *Attorney, Agent, or Firm* — Hawaii Patent Services; Nathaniel K. Fedde; Kenton N. Fedde (57) ABSTRACT

Provided is an image forming apparatus that increases an efficiency for network response. Thus, a network connection part receives a packet from an external network. A filter part distributes the packet received by network connection part for each protocol. A main response part that responds to the packet distributed by the filter part in the normal mode for controlling operation of each part. A sub response part that responds to some types of the packet, which is not distributed to the main response part by the filter part, in addition to the power saving mode where the main response part does not respond to the some types of the packet.

5 Claims, 5 Drawing Sheets

IMAGE FORMING APPARATUS AND IMAGE FORMATION METHOD THAT PERFORM PACKET RESPONSE IN THE POWER SAVING MODE

INCORPORATION BY REFERENCE

This application is based on and claims the benefit of priority from Japanese Patent Application No. 2014-012229 filed on Jan. 27, 2014, the contents of which are hereby incorporated by reference.

BACKGROUND

The present disclosure is related with an image forming apparatus and an image formation method, especially, the image forming apparatus and the image formation method that respond to a packet of a network in normal mode and in power saving mode.

An image forming apparatuses, such as an MFP (Multifunctional Peripheral,) can print a document and an image.

In such the image forming apparatus, it has states that the normal mode, which operates with regular power consumption and performs printing or the like, and the power saving mode, which cuts off power consumption and performs only a part of network response.

Here, a typical case of apparatus has a main system that performs response to a network packet in the normal mode and a subsystem that performs proxy responses with which the main system is in power saving. The image forming apparatus, after the main system fulfills transition condition to the power saving mode, distributes all the packet received from the external network to the subsystem in order not to restore carelessly.

SUMMARY

The image forming apparatus of the present disclosure includes a network connection part, a filter part, a main response part, and a sub response part. The network connection part receives a packet from an external network. The filter part distributes the packet received by the network connection part for each protocol. The main response part that responds to the packet distributed by the filter part in normal mode for controlling operation of each part. The sub response part that responds to some types of the packet, which is not distributed to the main response part by the filter part, in addition to power saving mode where the main response part does not respond to the some types of the packet.

The image formation method of the present disclosure is an image formation method executed with an image forming apparatus. In this case, a packet is received from an external network. The received packet is distributed for each protocol. For distributed the packet, it is responded by a main response part that responds in the normal mode for controlling operation of each part. For some types of the packet, which is not distributed to the main response part, it is responded by a sub response part that responds in addition to the power saving mode where the main response part does not respond to the some types of the packet.

DETAILED DESCRIPTION

[The Entire Configuration of Image Forming Apparatus 1]

Figure 1:
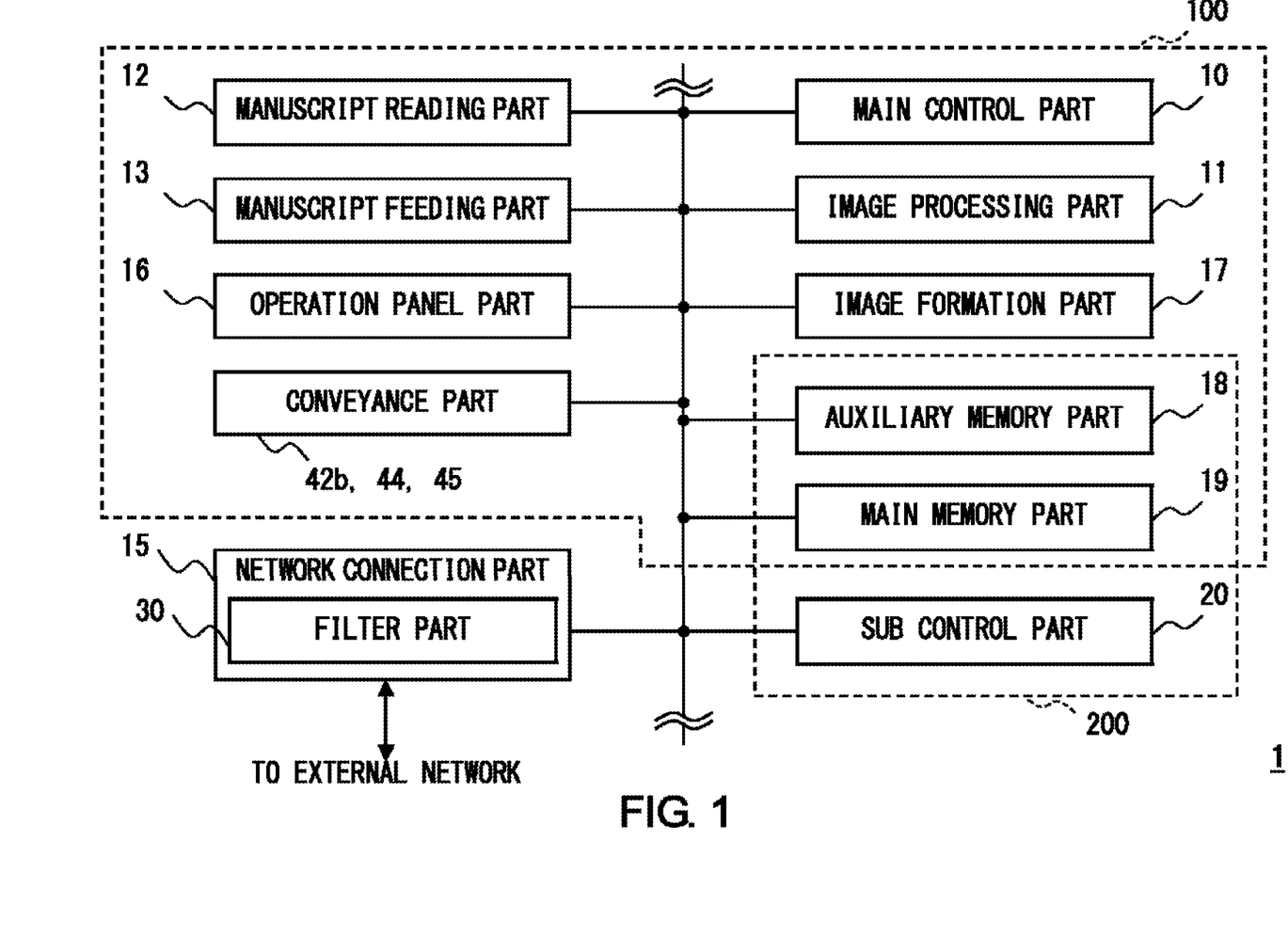
FIG. 1 is a block diagram illustrating a schematic configuration of an embodiment of an image forming apparatus in accordance with the present disclosure.

Firstly, referring to FIG. 1, entire configuration of image forming apparatus 1 is described.

Image forming apparatus 1 includes network connection part 15, main response part 100, and sub response part 200.

As for image forming apparatus 1, it is possible to make a state proceed to the normal mode, which is the mode having regular power consumption, and the power saving mode, which is the mode having lower power consumption than the normal mode.

At the time of the normal mode, both main response part 100 and sub response part 200 operate, and they asynchronously respond separate packet, respectively.

At the time of the power saving mode, sub response part 200 responds to packet for a protocol, which sub response part 200 can respond.

Image forming apparatus 1 includes main control part 10 (control part), image processing part 11, manuscript reading part 12, manuscript feeding part 13, a conveyance part, network connection part 15, operation panel part 16, image formation part 17, auxiliary memory part 18 (storage part), main memory part 19 (storage part), and sub control part 20 (control part). Conveyance part includes feed roller 42b, conveying roller 44, and ejection roller 45. Each part is connected by using same or different bus or the like. Also, an operation of each part is controlled by main control part 10 or sub control part 20, partially or entirely.

Accordingly, main response part 100 is configured to include main control part 10, image processing part 11, manuscript reading part 12, manuscript feeding part 13, a conveyance part, operation panel part 16, image formation part 17, auxiliary memory part 18, and main memory part 19.

Also, sub response part 200 is configured to include sub control part 20, auxiliary memory part 18, and main memory part 19.

Main control part 10 and sub control part 20 are information processing parts.

Main control part 10 and sub control part 20 read a control program memorized in auxiliary memory part 18, expand to main memory part 19, and executes the control program. Thereby, it is operated as each part of a functional block as described later. Also, main control part 10 and sub control part 20 control whole device according to specified instructions information that is inputted from the external terminal, which is not illustrated, or operation panel part 16.

Further, main control part 10 and sub control part 20 may not be one CPU or the like, physically. Accordingly, they may be a multi-core CPU or a CPU having multi-threading function. Also, each of them may be one of "arithmetic units" that is process unit executing a kernel of OS (Operating System), or the like, independently. Also, main control part 10 and sub control part 20 may be executed as AMP (Asymmetric Multiple Processor) configuration, principally. Also, main control part 10 and sub control part 20 may be set in separate memory space in main memory part 19. However, even in this case, it may be configured that it enables to read and write in mutual memory space.

Image processing part 11 is a controlling element for graphics operation. Image processing part 11 is a unit to execute specified image processing for image data. Image processing part 11 executes a scaling process, a density adjustment processing, a gradation adjustment process, an image improvement process, or the like, for example as various image processing.

Manuscript reading part 12 is a unit to read (scan) a manuscript, which is set.

Manuscript feeding part 13 is a unit to convey the manuscript read by manuscript reading part 12.

Image formation part 17 is a unit to make image formation from data, which is memorized in main memory part 19 and auxiliary memory part 18, is read by manuscript reading part 12, or is acquired from the external terminal, to a recording paper perform according to an output instruction by a user.

The conveyance part conveys a recording paper from sheet paper cassette 42a (FIG. 2), performs image formation by image formation part 17, and then conveys it to stack tray 50.

In addition, operation of manuscript reading part 12, manuscript feeding part 13, image formation part 17, and a conveyance part is described later.

Network connection part 15 is a network connection section including a LAN board, a wireless transmitter receiver, or the like, for connecting with an external network.

Network connection part 15 transmits and receives a TCP/IP packet from the external network, for example.

Network connection part 15 includes filter part 30 that distributes the received packet to main response part 100 and sub response part 200. The details of this filter part 30 are described later.

Operation panel part 16 includes a display and an input part. The input part has a numeric keypad, a start key, a cancel key, a button, a touch panel, or the like. The button and the touch panel retrieves instructions related to switch operational modes, such as copy, FAX transmission, and scanner, and perform a job, which is about print, transmission, storage, record, or the like, for a selected document.

Operation panel part 16 acquires instructions for the various jobs of image forming apparatus 1 by the user. Also, it is possible to input and change information for each user by user instruction acquired from operation panel part 16.

Auxiliary memory part 18 is an auxiliary storage area of a non-transitory recording medium. Auxiliary memory part 18 memorizes various programs and data.

In these, auxiliary memory part 18 includes the nonvolatile memory. The control program which includes the firmware for operation controlling image forming apparatus 1 in also, auxiliary memory part 18 is memorized. Also, the area of the storage folder for each user may be included in also, auxiliary memory part 18.

Main memory part 19 is a main storage area of a non-transitory recording medium. Main memory part 19 memorizes program and data read from auxiliary memory part 18.

Also, main memory part 19 temporarily memorizes a packet received in network connection part 15 and a packet for a response, which are made by main control part 10 or sub control part 20, or the like. In this case, main memory part 19 may memorize a packet, which can be read or write by any of network connection part 15, main control part 10, and sub control part 20. Also, main memory part 19 may memorize a packet or the like by using a method as like FIFO or a network stack.

In addition, image forming apparatus 1, main control part 10, image processing part 11, and sub control part 20 may be integrally formed.

Also, image forming apparatus 1 may include a FAX transmission and reception part performs a facsimile transmission/reception.

[Operation of Image Forming Apparatus 1]

Figure 2:
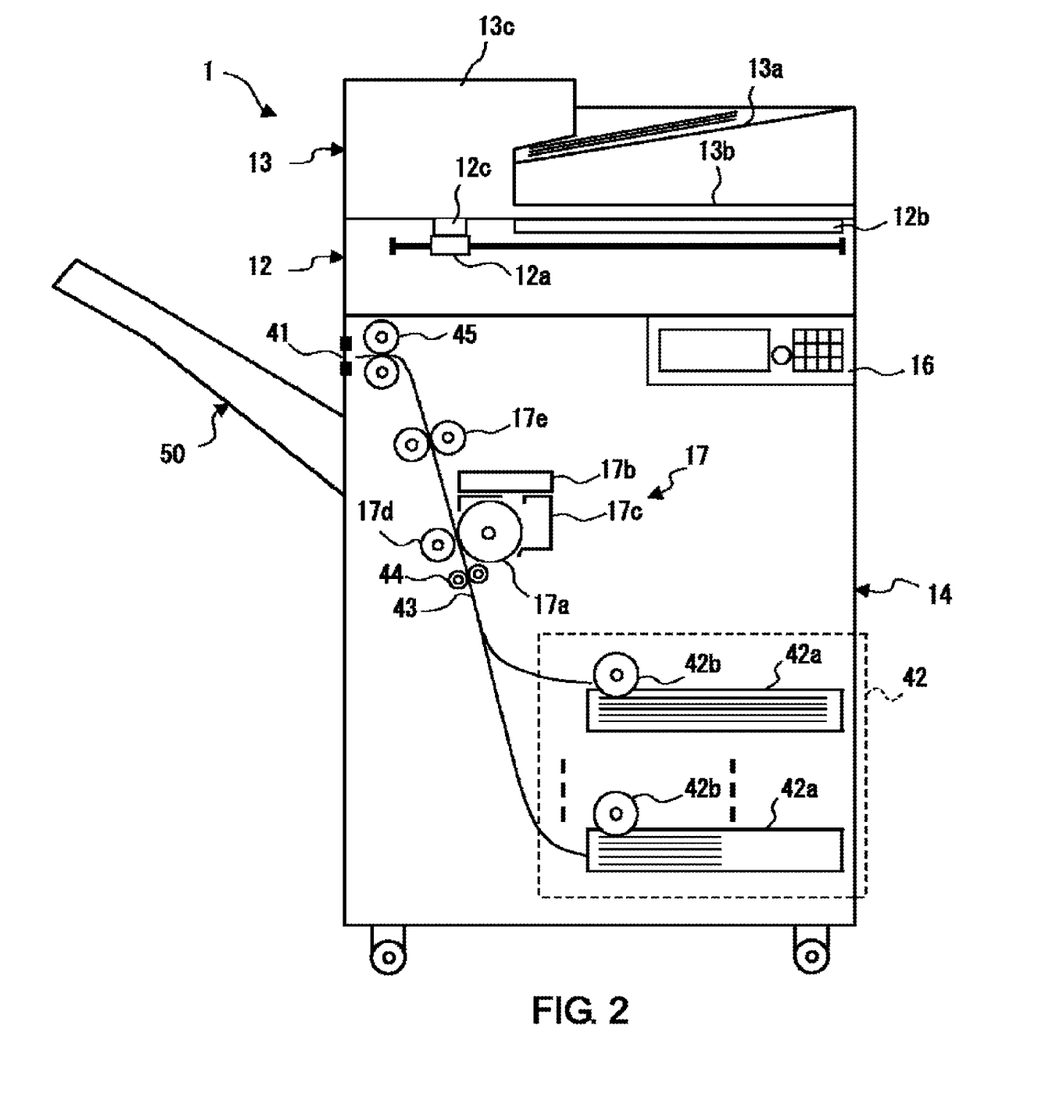
FIG. 2 is a schematic diagram of the image forming apparatus in FIG. 1.

Then, with reference to FIG. 2, operation of image forming apparatus 1 related to the embodiment of the present disclosure is explained.

Manuscript reading part 12 is allocated in an upper part of body part 14, and manuscript feeding part 13 is allocated in an upper part of manuscript reading part 12. Stack tray 50 is allocated in a side of discharge opening 41 for the recording paper and is formed in body part 14. Operation panel part 16 is allocated in a front-side of image forming apparatus 1.

Manuscript reading part 12 includes scanner 12a, platen glass 12b, and manuscript reading slit 12c. Scanner 12a is configured with an exposure lamp, imaging sensors, or the like, and is also configured as movable to transportation direction of the manuscript by manuscript feeding part 13.

Platen glass 12b is a manuscript stand configured by transparent members, such as glass. Manuscript reading slit 12c has a slit formed in orthogonal orientation of the transportation direction for the manuscript by manuscript feeding part 13.

When reading the manuscript placed in platen glass 12b, scanner 12a is moved to a position that faces platen glass 12b. Scanner 12a reads the manuscript by scanning the manuscript placed in platen glass 12b and acquires an image data. Scanner 12a outputs the acquired image data to body part 14.

Also, when reading the manuscript conveyed by manuscript feeding part 13, scanner 12a is moved to the position that faces manuscript reading slit 12c. Scanner 12a read a manuscript from manuscript reading slit 12c by synchronizing with conveying action of the manuscript by manuscript feeding part 13 and acquires image data. Scanner 12a outputs the acquired image data to body part 14.

Manuscript feeding part 13 includes manuscript mounting part 13a, manuscript discharge part 13b, and manuscript transport mechanism 13c. The manuscript placed in manuscript mounting part 13a is fed out one sheet at a time in order by manuscript transport mechanism 13c and conveyed in the position that faces manuscript reading slit 12c. The manuscript is discharged by manuscript discharge part 13b after that.

In addition, manuscript feeding part 13 is configured as retractable. That is, by raising up manuscript feeding part 13, an upper surface of platen glass 12b can be opened.

Body part 14 includes image formation part 17, feeding part 42, paper sheet conveying path 43, conveying roller 44, and ejection roller 45. Feeding part 42 has a plurality of sheet paper cassettes 42a and feed roller 42b. Each sheet paper cassette 42a respectively stores recording papers that differs from size or direction. Feed roller 42b feed outs one sheet of recording paper at a time to paper sheet conveying path 43 from sheet paper cassette 42a. Feed roller 42b, conveying roller 44, and ejection roller 45 function as a conveyance part. The recording paper is conveyed by the conveyance part. The recording paper is feed-out to paper sheet conveying path 43 by feed roller 42b is conveyed to image formation part 17 by conveying roller 44. Then, the recording paper, which the record is formed by image formation part 17, is discharged to stack tray 50 by ejection roller 45.

Image formation part 17 includes photo conductor drum 17a, exposure part 17b, developing part 17c, transfer part 17d, and fixing part 17e. Exposure part 17b is an optical unit, it outputs light or the like based on image data, exposes photo conductor drum 17a, and forms an electrostatic latent image in a front surface of photo conductor drum 17a. Developing part 17c is a development unit that develops an electrostatic latent image formed in photo conductor drum 17a by using toner. Developing part 17c makes the toner image based on the electrostatic latent image form on photo conductor drum 17a. Transfer part 17d makes the recording paper transfer the toner image formed on photo conductor drum 17a by developing part 17c. Fixing part 17e heats the recording paper, which the toner image is transferred by transfer part 17d, and fixes the toner image to the recording paper.

[The Control Configuration of Image Forming Apparatus 1]

Figure 3:
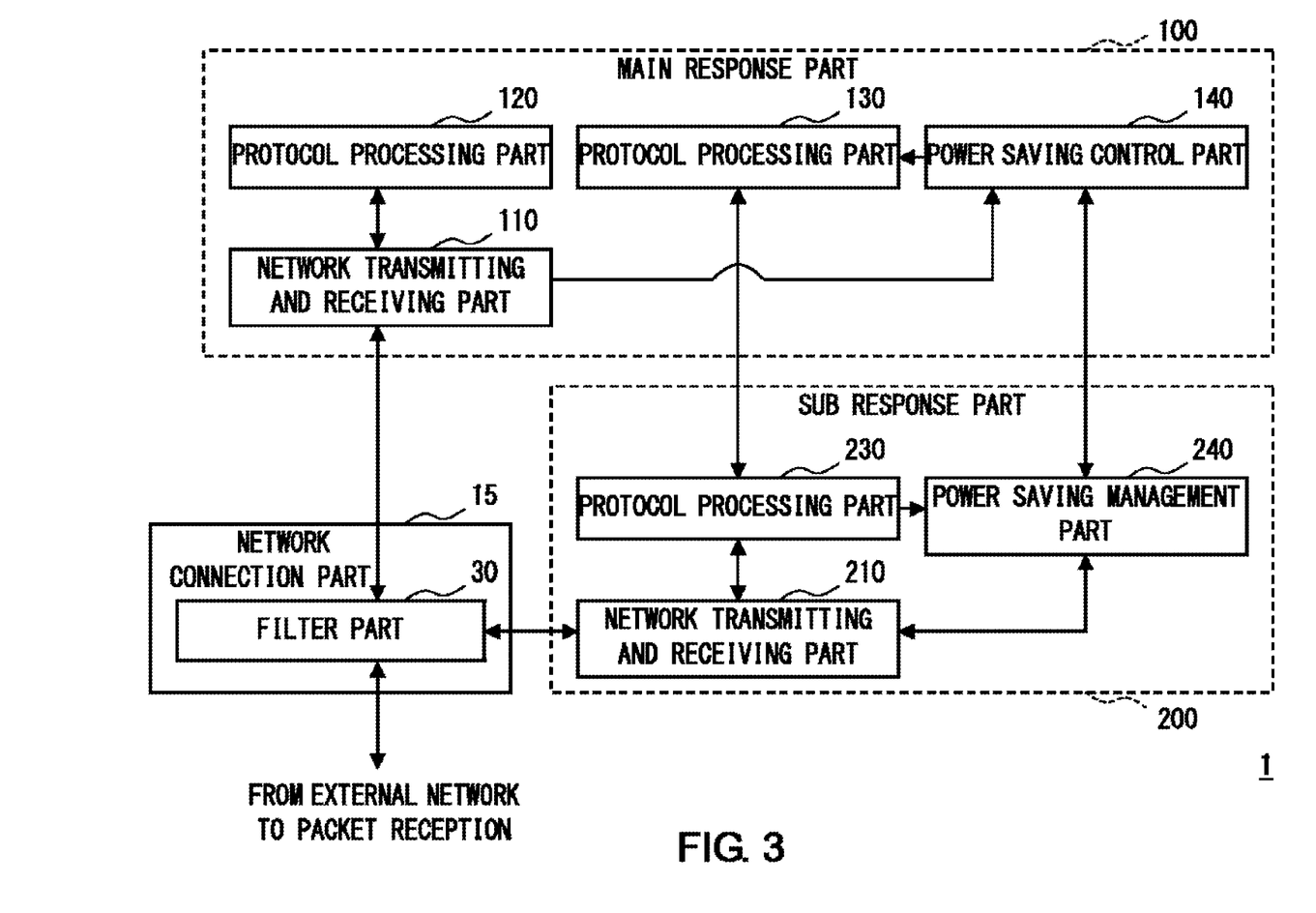
FIG. 3 is a block diagram illustrating an example of control configuration of the image forming apparatus in FIG. 1.

Then, referring to FIG. 3, the control configuration of network connection part 15, the main response part 100, and sub response part 200 in image forming apparatus 1 is described.

Network connection part 15 has filter part 30 as mentioned above.

Also, main response part 100 includes network transmitting and receiving part 110, protocol processing part 120, protocol processing part 130, and power saving control part 140.

Also, sub response part 200 is provided with network transmitting and receiving part 210, protocol processing part 230, and power saving management part 240.

Network connection part 15 receives the packet from the external network, as mentioned above.

Filter part 30 of network connection part 15 distributes the packet received from the external network to main response part 100 and sub response part 200 appropriately for each protocol. Thereby, filter part 30 distributes a packet, which includes a packet of a protocol dealing with print data and is set up previously, need to be responded in the normal mode to main response part 100.

Also, filter part 30 distributes a packet, which includes a packet of a protocol including ARP and SNMP set up previously, to be responded at least a part in the power saving mode to sub response part 200.

Also, in case of the distribution, filter part 30 performs exclusive control that distributes the packet, which cannot be distributed to main response part 100, to sub response part 200. Also, a common IP address and MAC Address may be used both of main response part 100 and sub response part 200.

Also, filter part 30 may perform port conversion and NAT (Network Address Translation,) conversely.

The main response part 100, about the packet distributed by filter part 30, performs a response to the packet including the print data, or the like, which can mainly respond only at the time of the normal mode.

Also, the main response part 100 proceeds to the power saving mode, when not receiving the packet distributed by filter part 30 greater than or equal specified time.

Network transmitting and receiving part 110 acquires and analyzes the packet distributed to the main response part 100 by filter part 30 and transmits to protocol processing part 120.

Also, network transmitting and receiving part 110 transmits the packet, which the response is performed by protocol processing part 120, to network connection part 15.

Also, network transmitting and receiving part 110 notifies to power saving control part 140, when the packet distributed to main response part 100 by filter part 30 is not acquired for the specified time.

Also, network transmitting and receiving part 110 acquires the notice of proceeding from the power saving mode to the normal mode by power saving control part 140 and notifies to protocol processing part 130.

Protocol processing part 120 makes perform various processes to each part about the packet acquired by network transmitting and receiving part 110.

Also, protocol processing part 120 responds the packet acquired by network transmitting and receiving part 110 and transmits the responded packet to network transmitting and receiving part 110.

Protocol processing part 130 receives the packet which was not able to be processed by sub response part 200 from protocol processing part 230 of sub response part 200, and performs various processing. Protocol processing part 130 responds these packets, and transmits this packet that responded to protocol processing part 230. Also, protocol processing part 130 receives the packet which cannot respond by sub control part 200 in the power saving mode from power saving control part 140, and also if the notice which illustrates having proceeded to the normal mode is received, it performs the process which acquires this packet and responds.

That is, protocol processing part 130 performs the response to the packet which was not able to be processed by protocol processing part 230. Therefore, a packet of the same kind is not responded by the main response part 100 and sub response part 200.

Power saving control part 140, when the packet distributed by filter part 30 is not received greater than or equal for the specified time, makes each part proceed to the power saving mode. Thereby, power saving control part 140 transmits the notice about proceeding to the power saving mode to power saving management part 240 in sub response part 200.

Also, power saving control part 140, when returning from the power saving mode to the normal mode by instructions of sub response part 200, notifies that effect to protocol processing part 130.

Sub response part 200 responds to the packet having some types of protocols and being distributed by filter part 30. Sub response part 200, for example, about the packet of the protocol including ARP and SNMP, which can be responded even in the power saving mode, also responds in the power saving mode. Also, Sub response part 200 in the present embodiment, even if it is in the normal mode, the packets of these protocols are processed exclusively to the main response part 100.

Also, sub response part 200, when the packet that cannot be responded at the time of the power saving mode is received, made main response part proceed and respond to the normal mode.

Network transmitting and receiving part 210 acquires and analyzes the packet distributed to sub response part 200 by filter part 30 and transmits to protocol processing part 230.

Protocol processing part 230 makes various processes perform to each part about the packet acquired by network transmitting and receiving part 210.

Also, protocol processing part 230 responds the packet acquired by network transmitting and receiving part 210 and transmits the responded packet to network transmitting and receiving part 210.

Also, protocol processing part 230, when the packet that cannot be responded itself is acquired by network transmitting and receiving part 210, transmits to protocol processing part 130 in the main response part 100. Thereby, protocol processing part 230 notifies to power saving management part 240, when it is in the power saving mode, then, after the main response part 100 returns to the normal mode, transmits the packet to protocol processing part 130.

Power saving management part 240, when the notice is received from protocol processing part 230, makes to proceed from the power saving mode to the normal mode.

Also, power saving management part 240, when main response part 100 proceeds from the power saving mode to the normal mode, notifies to protocol processing part 230 via network transmitting and receiving part 210.

Here, main control part 10 in image forming apparatus 1 executes the control program for main response part 100 memorized in auxiliary memory part 18 and expanded to main memory part 19. Thereby, main control part 10 functions as network transmitting and receiving part 110, protocol processing part 120, protocol processing part 130, and power saving control part 140.

Also, sub control part 20 of image forming apparatus 1 executes the control program for sub response part 200 memorized in auxiliary memory part 18 and expanded to main memory part 19. Thereby, sub control part 20 functions as network transmitting and receiving part 210, protocol processing part 230, and power saving management part 240.

Also, the above-mentioned each part in image forming apparatus 1 serves as hardware resources that performs the image formation method in the present disclosure.

[Packet Response Process by Image Forming Apparatus 1]

Figure 4:
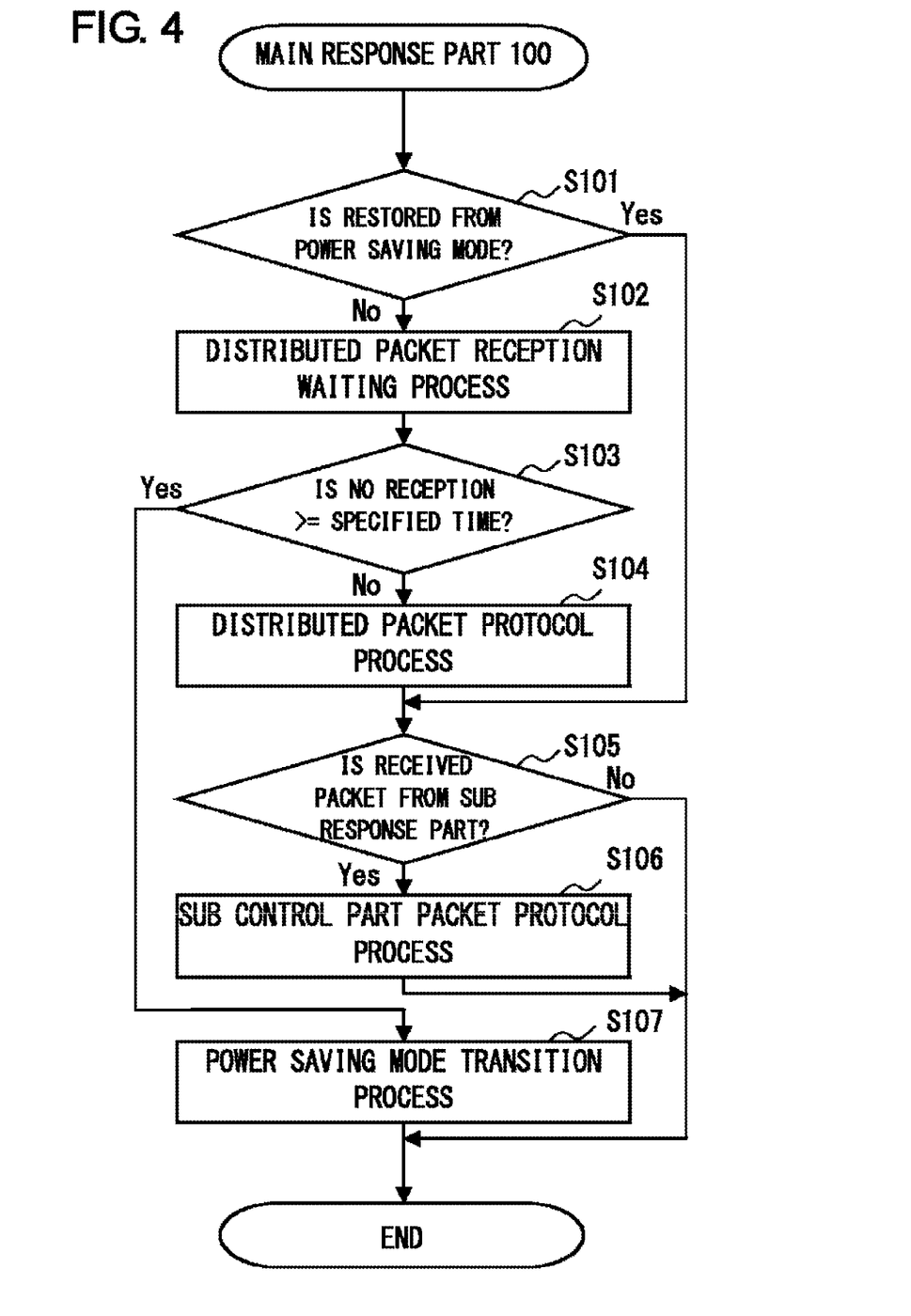
FIG. 4 is a flow chart that shows process of a packet receiving process for a main response part in accordance with the embodiment of the present disclosure.
Figure 5:
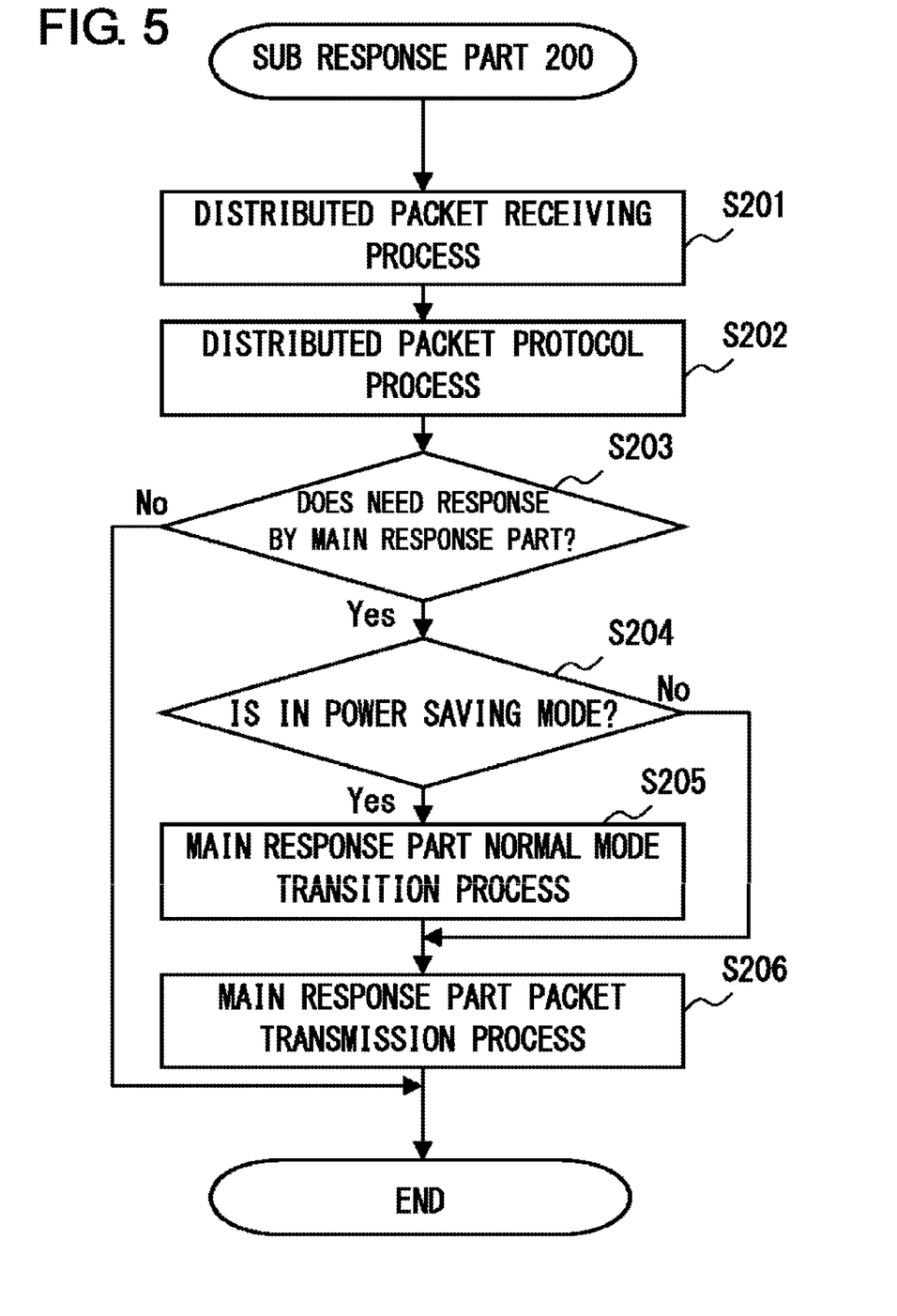
FIG. 5 is a flow chart that shows the process of a packet receiving process for a sub response part in accordance with the embodiment of the present disclosure.

Then, with reference to FIG. 4-FIG. 5, a process by image forming apparatus 1 related to the embodiment in the present disclosure is explained. In the packet response process of the present embodiment, the process that respectively responds a packet by the main response part 100 and sub response part 200 is performed at the time of the normal mode. The packet is received from the external network and distributed appropriately for each protocol by filter part 30. Also, at the time of the power saving mode, the packet of the protocol, which sub response part 200 can respond, is responded by sub response part 200. In the packet response process of the present embodiment, for the process of the main response part 100, main control part 10 as main response part 100 executes a program, which is expanded to main memory part 19 from auxiliary memory part 18. In this case, main control part 10 collaborates with each part and executes by using hardware resources. Also, the process of sub response part 200, sub control part 20 as sub response part 200 executes a program, which is expanded by main memory part 19 from auxiliary memory part 18. In this case, sub control part 20 collaborates with each part and executes by using hardware resources.

In the following, with reference to the flow chart of FIG. 4, firstly, it is explained details of the process for the main response part 100 in the packet response process in the present embodiment.

(Step S101)

Here, main response part 100 has already operated in the normal mode.

However, at first, protocol processing part 130 determines whether or not it is in a state of restoring from the power saving mode at present. Protocol processing part 130 determines with Yes if the notice of the transition from the power saving mode to the normal mode is received from power saving control part 140. Protocol processing part 130 determines with No, if the notice is not received.

In Yes, protocol processing part 130 advances a process to Step S105.

In No, protocol processing part 130 advances a process to Step S102.

(Step S102)

If the notice is not received from power saving control part 140, network transmitting and receiving part 110 performs a distributed packet reception waiting process.

Network transmitting and receiving part 110, within the packets received from the external network in network connection part 15, waits until it acquires the packet distributed to the main response part 100 by filter part 30.

If the packet is acquired, network transmitting and receiving part 110 analyzes and transmits it to protocol processing part 120.

(Step S103)

Then, protocol processing part 120 determines whether or not there is any reception of the packet for greater than or equal to the specified time. Protocol processing part 120 determines with Yes, if a timer or the like shows there is not received the packet distributed to the main response part 100 for greater than or equal to the time set previously. About the specified time, by operation panel part 16, a user can set up time, such as tens of seconds to several hours as "the power saving mode transit time," or the like. Also, protocol processing part 120 may judge that it becomes greater than or equal to this specified time, if it is the time set up based on working hours, a business day, or the like. On the contrary, protocol processing part 120 determines with No, if the packet is received from network transmitting and receiving part 110 within the specified time.

In Yes, protocol processing part 120 advances a process to Step S107.

In No, protocol processing part 120 advances a process to Step S104.

(Step S104)

When a packet is received, protocol processing part 120 performs a distributed packet protocol process.

Protocol processing part 120 collaborates with each part and executes a process according to a protocol of the data included in the received packet. For example, if the packet is for print data, protocol processing part 120 outputs it to image formation part 17 and makes to print.

Also, if a packet for a response corresponding to the received packet is needs to make, protocol processing part 120 may make it and transmits to network connection part 15 from network transmitting and receiving part 110.

(Step S105)

Here, protocol processing part 130 determines whether or not the packet is acquired from sub response part 200.

Protocol processing part 130 determines with Yes, if a packet is received from protocol processing part 230 of sub response part 200. If there is a packet that cannot be processed by protocol processing part 230 of sub response part 200 at the time of the power saving mode and it proceeds from the power saving mode to the normal mode, protocol processing part 130 determines with Yes at the time when receiving the notice of that effect from power saving control part 140. Protocol processing part 130 determines with No, if other.

In Yes, protocol processing part 130 advances a process to Step S106.

In No, protocol processing part 130 finishes the process for the main response part 100 in the packet response process.

(Step S106)

If the packet is acquired from sub response part 200, protocol processing part 130 performs a sub control part packet protocol process.

Protocol processing part 130, as similar to the distribution packet protocol process in Step S104, controls about each part corresponding to each protocol of the received packet, make and transmits the packet to respond.

After transmission, protocol processing part 130 completes the process for the main response part 100 in the packet response process.

(Step S107)

If there is no reception of a packet greater than or equal to the specified time, power saving control part 140 performs the power saving mode transition process.

Power saving control part 140 suspends the electrical power application for each part, or makes transit to the power saving state, and also changes main control part 10 itself into states, such as standby (HALT). In this case, it notifies to power saving management part 240 of sub response part 200.

As above-mentioned, the process for the main response part 100 in the packet response process related to the embodiment in the present disclosure is ended.

Then, in case of the power saving mode, main response part 100 waits until it restores to the normal mode. Also, in case of the normal mode, the main response part 100 repeats the correspondence to the packet distributed to the main response part 100 by filter part 30.

Then, with reference to the flow chart of FIG. 5, it is explained details of a process for sub response part 200 in the packet response process for each step.

(Step S201)

Firstly, network transmitting and receiving part 210 performs a distributed packet receiving process.

Network transmitting and receiving part 210 waits until it acquires the packet distributed to sub response part 200 by filter part 30 within the packets received from the external network in network connection part 15. If the packet is acquired, network transmitting and receiving part 210 analyzes and transmits it to protocol processing part 230.

(Step S202)

Then, protocol processing part 230 performs a distributed packet protocol process.

About the packet received from network transmitting and receiving part 210, protocol processing part 230 controls each part by each corresponding protocol, makes the packet to respond, and transmits it. This is as similar to the distribution packet protocol process in Step S104.

In this case, if it is the packet to be responded by main response part 100, protocol processing part 230 leaves it.

(Step S203)

Then, protocol processing part 230 determines whether or not a response by main response part 100 is required. Protocol processing part 230 determines with Yes, if it is a packet to be responded by main response part 100. Protocol processing part 230 determines with No, if it is a packet in which the response by sub response part 200 is possible.

In Yes, protocol processing part 230 advances a process to Step S204.

In No, protocol processing part 230 finishes the process for sub response part 200 in the packet response process.

(Step S204)

If the response by the main response part 100 is required, protocol processing part 230 determines whether or not it is in the power saving mode.

In Yes, which is in case of the power saving mode, protocol processing part 230 advances a process to Step S205.

In No, which is in case of the normal mode, protocol processing part 230 advances a process to Step S206.

(Step S205)

If it is the power saving mode, power saving management part 240 performs the main response part the normal mode transition process.

Power saving management part 240 starts main control part 10 and instructs power saving control part 140 of the main response part 100 to perform the transition from the power saving mode to the normal mode. Thereby, main response part 100 proceeds from the power saving mode to the normal mode.

(Step S206)

Here, protocol processing part 230 performs a main response part packet transmission process.

Protocol processing part 230 transmits the packet to be responded by the main response part 100 to protocol processing part 130 of the main response part 100.

As above-mentioned, the process for sub response part 200 in the packet response process related to the embodiment in the present disclosure is ended.

Then, if the packet distributed to sub response part 200 by filter part 30 is received, sub response part 200 repeats the correspondence to the packet.

The following effects can be acquired with configuring as above.

In a typical case, it is needed to have the same type of protocol processing part that responds to the same kind packet of the same protocol both in a main response part and in a sub response part, respectively.

Contrary, image forming apparatus 1 related to the embodiment in the present disclosure includes network connection part 15 that receives a packet from an external network; filter part 30 that distributes the packet received by network connection part 15 for each protocol; main response part 100 that responds to the packet distributed by filter part 30 in the normal mode for performing operation control for each part; and sub response part 200 that responds to some types of the packet, which is not distributed to the main response part 100 by filter part 30, in addition to the power saving mode where the main response part 100 does not respond to the some types of the packet.

As configured in this way, filter part 30 is arranged to the outside of the main response part 100 and sub response part 200, and it distributes the received packet to main response part 100 and sub response part 200 appropriately for each protocol. Therefore, it becomes unnecessary to be prepared the protocol processing part, which processes the same kind of the packet of the same protocol, double to main response part 100 and sub response part 200, respectively. Therefore, the futility of the network response is reduced, and an efficient process can be performed in each packet. The system resource (resources) of main control part 10 for responding to an also, packet, sub control part 20, main memory part 19, and auxiliary memory part 18 can be saved.

Also, because of responding the type of packet that can respond by sub response part 200 at the time of the normal mode, different packets can be processed by the main response part 100 and sub response part 200, respectively. Therefore, processing efficiency becomes high and can reduce power consumption as a result.

Also, in a typical case, for cache information, a state of a network stack, or the like, since compatibility with a main system and a subsystem is not obtained, it may not be respond as regulation of the protocol. That is, the received packet, which does not have a protocol that just return a response simply for a request and has a protocol that is needed to process cache information and a state transition, it happens a case having difficulty to take compatibility with a main system and a subsystem.

As compared with this, in the present embodiment, even if it is the normal mode and the power saving mode, filter part 30 can distribute the packet of the protocol, which sub response part 200 can respond. Then, it is configured to respond by sub response part 200. Therefore, when it restores from the power saving mode to the normal mode, it is possible to prevent happening inconsistency in the state of a network stack. Consequently, in a protocol as like SNMP or ARP, it becomes possible to perform the response as regulation of the protocol.

That is, in a typical case, the protocol processing part that responds the same kind of packet of the same protocol is needed for both the main system and the subsystem.

The present disclosure provides the image forming apparatus that cancels an above-mentioned subject.

According to the present disclosure, a filter distributes a packet received from a network for each protocol to a main response part that responds at the time of the normal mode, and a sub response part that also responds at the time of the power saving mode. Thereby, the image forming apparatus, which is not necessary to equip the main response part and the sub response part with the protocol processing part that responds the same kind of packet of the same protocol separately, can be provided.

Also, image forming apparatus 1 related to the embodiment in the present disclosure, the main response part 100 proceeds to the power saving mode if not receiving the packet distributed by the filter part 30 for greater than or equal to specified time.

As configured in this way, if the packet that responds by the main response part 100 is not received, it becomes possible to make it proceed from the normal mode to the power saving mode. Thereby, it can be made to proceed to the power saving mode in the state where all PCs, which make print data, are shutdown, however, the packet that can be responded by sub response part 200 is transmitted from the router, or the like.

Consequently, power consumption can be reduced and cost can be reduced.

Also, image forming apparatus 1 related to the embodiment in the present disclosure, sub response part 200 makes the main response part 100 proceed to the normal mode for responding when receiving the packet that cannot respond in the power saving mode.

As configured in this way, it responds to some types of packet by sub response part 200 even if it is complicated protocols, such as SNMP. Also, if the type of packet that cannot respond is distributed, it becomes possible to make main response part 100 respond to the packet. Therefore, it can respond without making inconsistency in the network stack, or the like. Also, about some types of the packet, such as SNMP or the like, which can respond by sub response part 200, since it becomes possible to respond at the time of the power saving mode by sub response part 200, power consumption is reducible.

Also, image forming apparatus 1 related to the embodiment in the present disclosure, filter part 30 distributes the packet for a protocol dealing with print data to the main response part 100. Also, the packet of a protocol including ARP and SNMP is distributed to sub response part 200.

As configured in this way, about main response part 100 and sub response part 200, scale of a circuit required for a response, system resource, or the like, can be distributed easily. Consequently, cost is reducible for main response part 100 and sub response part 200.

In addition, in the embodiment of the present disclosure, main response part 100 and sub response part 200 is described that main control part 10 and sub control part 20 is realized by executing a program, respectively. However, for main response part 100 and sub response part 200, it is configured a part or all is ASIC for exclusive use, or the like. Also with filter part 30, auxiliary memory part 18 memorizes, to an also, contrary, the program expanded at main memory part 19 is executed, and it may be realized.

As configured in this way, the efficiency of a response for a packet is optimized in general, and cost can be reduced.

Also, in an above-mentioned embodiment, it is described that auxiliary memory part 18 and main memory part 19 are shared both in main control part 10 and sub control part 20.

However, it may have a configuration that main control part 10 and sub control part 20 have auxiliary memory part 18 or main memory part 19, respectively. In this case, data is transmitted and received between main control part 10 and sub control part 20 via a shared memory, or the like.

As configured in this way, cost is reducible. Also, sub response part 200 can be mounted and removed easily as a network board, or the like.

Also, filter part 30 may change distribution pattern for each protocol for a packet to main response part 100 and sub response part 200 in the normal mode and in the power saving mode. In this case, even if it is the packet to be responded at the time of the normal mode, filter part 30 may distribute to sub response part 200.

As configured in this way, in the normal mode and in the power saving mode, main response part 100 and sub response part 200 can perform optimal response to the packet, and it can reduce cost.

Also, the present disclosure is applicable to information processing equipment other than an image forming apparatus.

That is, it may be a configuration by using a network scanner, a server connected to a scanner separately with USB, or the like.

Also, the configuration and operation of the above-mentioned embodiment are an example, and it cannot be overemphasized that it can change suitably and can perform in the range that does not deviate from the aim of the present disclosure.

The invention claimed is:

1. An image forming apparatus, comprising:
   a network connection part that receives a packet from an external network;
   a filter part that distributes the packet received by the network connection part for each protocol;
   a main response part that responds to the packet distributed by the filter part in normal mode for controlling operation of each part; and
   a sub response part that responds to some types of the packet, which is not distributed to the main response part by the filter part, in addition to power saving mode where the main response part does not respond to the some types of the packet.

2. The image forming apparatus according to claim 1, wherein
   the main response part proceeds to the power saving mode if not receiving the packet distributed by the filter part for greater than or equal to specified time.

3. The image forming apparatus according to claim 1, wherein
   the sub response part makes the main response part proceed to the normal mode for being responded when receiving the packet that cannot respond in the power saving mode.

4. The image forming apparatus according to claim 1, wherein
   the filter part distributes the packet for a protocol dealing with print data to the main response part and distributes the packet of a protocol including ARP and SNMP to the sub response part.

5. An image formation method executed by an image forming apparatus, comprising the steps of:

receiving a packet from an external network;
distributing received the packet for each protocol;
responding to distributed the packet by a main response part that responds in normal mode for controlling operation of each part; and
responding to some types of the packet, which is not distributed to the main response part, by a sub response part that responds in addition to power saving mode where the main response part does not respond to the some types of the packet.

* * * * *